Nov. 7, 1961   F. P. WRUBLESKI   3,007,373
DE-BURRING DEVICE FOR GEAR CUTTING MACHINE
Filed June 19, 1959   2 Sheets-Sheet 1
FIG. 1
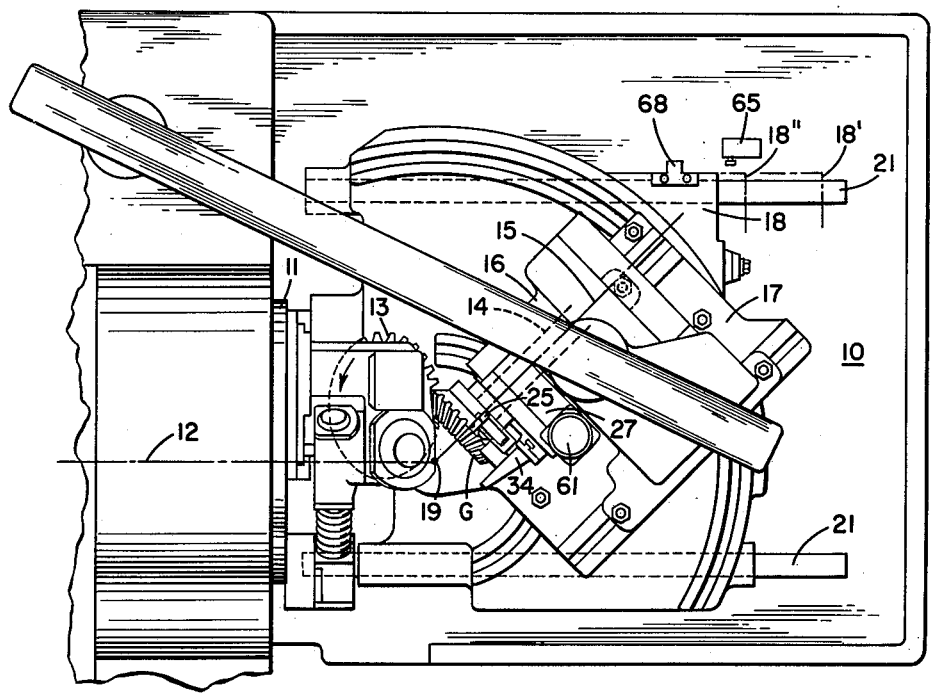
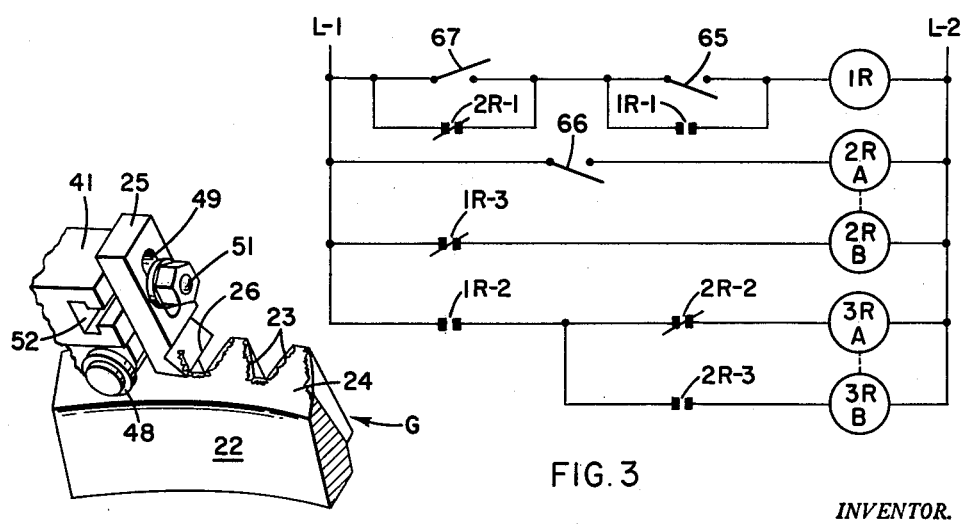
FIG. 2
FIG. 3
INVENTOR.
FELIX P. WRUBLESKI
BY
*Richard W. Treverton*
ATTORNEY

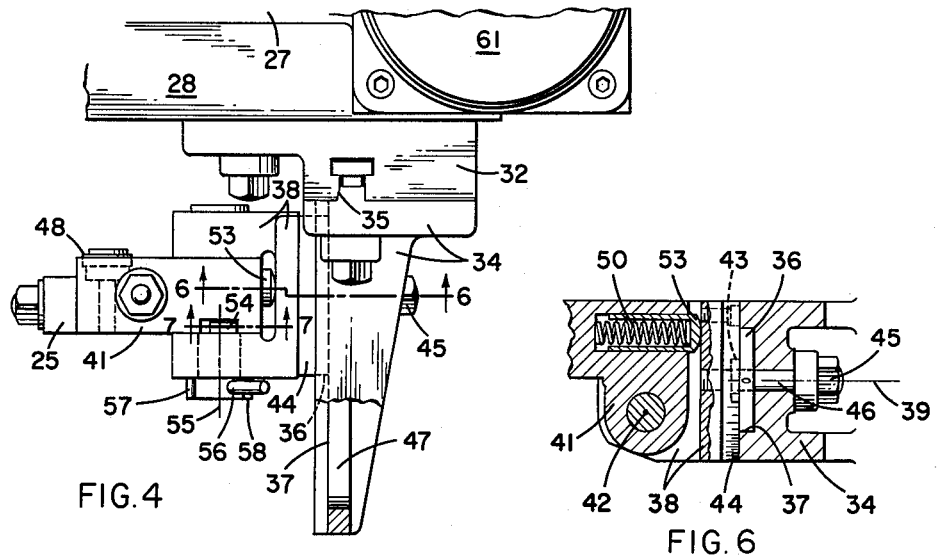

3,007,373
DE-BURRING DEVICE FOR GEAR CUTTING MACHINE
Felix P. Wrubleski, Rochester, N.Y., assignor to The Gleason Works, Rochester, N.Y., a corporation of New York
Filed June 19, 1959, Ser. No. 821,548
12 Claims. (Cl. 90—1.4)

The present invention relates to a de-burring device for a gear cutting machine, especially a bevel gear generating machine.

In such machines the cutter blades, which while cutting traverse the gear teeth from the small to the large ends thereof, leave burrs along the edges of the teeth at the large ends. These burrs are very tenacious and in many cases must be filed off before the gears can be used.

The present invention utilizes the generating and tooth-to-tooth indexing motions of the work gear to remove the burrs from most of the teeth by means of a tool which remains stationary on the work head of the machine during the tooth-cutting operation. At the conclusion of this operation burrs on the remaining few teeth are removed by a rapid rotation of the tool through only a fraction of a turn around the axis of gear, and return. Accordingly the de-burring operation increases only slightly the total time that gear remains on the machine, and it eliminates the operation of filing off the burrs after the gear has been removed from the machine.

The preferred embodiment of the invention is shown in the accompanying drawings, wherein:

FIG. 1 is a fragmentary plan view of a machine equipped with the de-burring device;

FIG. 2 is a fragmentary perspective view showing the relationship of the de-burring tool to a work gear;

FIG. 3 is an electrical wiring diagram of the device;

FIG. 4 is a plan view, on a much larger scale than FIG. 1, of the forward part of the de-burring device;

FIG. 5 is a front view of the device; and,

FIGS. 6, 7 and 8 are detail sectional views respectively in planes 6—6 and 7—7 of FIG. 4 and plane 8—8 of FIG. 5.

The particular machine shown in FIG. 1 is a straight bevel gear generator of the general type shown in Patent No. 2,869,427. It has a frame 10 on which a cradle 11 is rotatable back and forth about horizontal axis 12, the cradle carrying a pair of disc-shaped milling cutters 13, only the upper one of which appears in the view. The blades of these cutters inter-mesh so that the cutters act simultaneously in the same tooth space of the work gear G. The axes of the cutters are relatively inclined so that one cutter produces one tooth side and the other cutter the opposite tooth side of the tooth space. A work spindle 14, whose axis is horizontal and is designated 15, supports the work gear for rotation relative to work head 16. The latter is adjustable in the direction of the spindle axis on a swinging base 17 which in turn is adjustable along arcuate ways on a sliding base 18 about an upright axis 19 that intersects both cradle axis 12 and work spindle axis 15. Sliding base 18 is adjustable, and is also movable during operation of the machine, along ways 21 on base 10 in a direction parallel to the cradle axis.

The gear blank is chucked on spindle 14 after the sliding base has been withdrawn to position 18′, so that the blank will be well away from the cutters. In operation of the machine the sliding base moves inwardly to the position shown in full lines in FIG. 1 causing the milling cutters 13 to rough cut a tooth slot in the blank. The cradle and the work spindle then each make one oscillation back and forth about their respective axes 12 and 15, to cause the cutters to generate the sides of the tooth space. The sliding base then withdraws to position 18″, just far enough to bring the work gear completely clear of the cutters, the work spindle indexes to advance the work gear by one pitch in a counterclockwise direction, as viewed from the back face 22 of the work gear, as in FIG. 2. The sliding base then advances, cutting a second tooth slot as the first step of a second tooth cutting cycle. The cycle described repeats until all tooth sides have been generated after which the sliding base returns to loading position 18′. During the generating roll of each cycle, the work gear rotates first counterclockwise, as viewed in FIG. 2, and then returns by clockwise motion.

Cutter rotation is counterclockwise as viewed in FIG. 1, so that the blades cut from the small to the large end of the tapering tooth space, which results in burrs 23 being formed along the edges of the teeth on back cone face 24 of the gear G, as shown in FIG. 2. The de-burring tool 25 has a cutting edge 26 adapted for relative movement over this back cone face about the work spindle axis 15. The tool is mounted on a tool carrier which is rotatable about the spindle axis on a C-shaped housing 27 that is secured to and constitutes a part of the work head. The tool carrier comprises: a circular slide 28 that is rotatable on cylindrical surface 29 of the housing and is retained by a gib 31; an arm 32 adjustable on the circular slide along T-slotted circular way 33 concentric with axis 15; a vertical adjustment bracket 34 adjustable along way 35 of the arm to vary the radial distance of tool 25 from the axis; a back angle setting plate 36 adjustable along recessed way 37 in bracket 34 parallel to axis 15; and a bifurcated pivot bracket 38 adjustable on plate 36 about an axis 39 perpendicular to both ways 35 and 37. A holder 41 for tool 25 is pivoted to the pivot bracket 38 of the carrier for motion about an axis 42, perpendicular to axis 39, between a working position shown in FIG. 2 and an idle position wherein the tool is clear of the work gear.

Referring to FIGS. 4 and 6, the plate 36 has a center 43 on which a back angle setting dial 44 turns about axis 39, the dial being secured to and, in effect, being a part of pivot bracket 38. The dial has graduations cooperating with a zero mark on plate 36 to facilitate the adjustment of the tool about axis 39 in accordance with the back angle of the work gear, i.e. the angle between surface 24 and axis 15. Such adjustment is made after first loosening a nut 45 that is screw-threaded to a stud 46 anchored to pivot bracket 38. Loosening of the nut also permits adjustment of the plate 36 along way 37 on vertical adjustment bracket 34. The stud 46 extends through an elongated slot 47 provided in bracket 34 to accommodate this latter adjustment.

The tool holder 41 has a roller 48 for contact with the back cone face 24 of the gear to prevent the tool from cutting or scraping this face. The tool is adjustable on the holder, for this purpose having an elongated slot 49 for T-bolt 51 which secures it to the holder, and the holder having a T-slot 52 for the bolt that is perpendicular to slot 49. Satisfactory results have been obtained by adjusting the edge 26 to about one thousandths of an inch from surface 24. A plunger 53, backed by a spring 59, is carried by the tool holder and acts on the pivot bracket 38 to maintain the roller in contact with the gear. In setting up the machine the slide 34 is so adjusted that the spring is compressed sufficiently to hold the roller 48 firmly against the gear. In order to facilitate removal of the gear from the work spindle, the tool may be lifted away fom the gear by a manually operable eccentric 54, FIGS. 4, 5 and 7. The eccentric is rotatable in pivot bracket 38 about axis 55, by means of a handle 56, between limit positions determined by stops 57 and 58. When the handle is swung against stop 58 the eccentric is rotated to the position shown wherein it acts upon surface 59 to lift and hold the tool 25 away from the work gear. When the handle is against stop 57 the eccentric is out of contact with surface 59.

Movement of the tool carrier 28, 32, 38 back and forth about axis 15 is effected by a reversible motor 61 mounted on housing 27. On armature shaft 62 of the motor there is a worm 63, FIGS. 5 and 8, which meshes with a worm wheel segment 64 secured to circular slide 28. The motor is controlled by a starting switch 65, FIGS. 1 and 3, secured to the machine frame, and by a reversing switch 66 and a stop switch 67 both secured to housing 27. Switch 65 is operated by a cam 68 on sliding base 18 when the latter withdraws at the conclusion of a gear cutting cycle of the machine, and switches 66 and 67 are controlled by cams 69 and 71 which are independently adjustable along arcuate way 33 on circular slide 28 to establish the angle through which the slide is rotated back and forth on the head by the motor and also the terminal position of the slide. The terminal position of the tool itself depends also upon the adjustment of arm 32 along way 33. The motor 61 has associated therewith a spring-applied, electromagnetically released brake, to stop rotation of the armature shaft 62 immediately upon deenergization of the motor.

During operation of the machine, after a number N of indexing operations sufficient to bring cut tooth spaces beneath the stationary tool 25, the latter will act to remove burrs from one tooth, or from one tooth space, during each subsequent generating rotation of the gear, counterclockwise in FIG. 2, since each indexing operation results in advance of the gear by one pitch. The number N, which represents the number of teeth or tooth spaces which are not de-burred, depends upon how closely the tool 25 can be adjusted to the tooth space being cut. This in turn depends upon the design of the particular gear being cut. After all of the gear teeth have been generated, the sliding base 18 is automatically withdrawn and this causes momentary closing of switch 65. As will be seen by reference to FIG. 3, this connects relay 1R across leads L–1 and L–2 inasmuch as contact 2R–1 is closed at this time. Energization of the relay causes its contacts 1R–1 and 1R–2 to close and its contacts 1R–3 to open. This results in deenergization of coil B of a latch relay 2R, whose contacts 2R–1 and 2R–2 however remain closed and whose contacts 2R–3 remain open. By closing of contact 1R–2 the coil A of a controller 3R for motor 61 is energized, causing the motor to drive the carriers 28, 32, 38 and tool 25 counterclockwise in FIG. 5 (clockwise in FIG. 2) to remove the burrs from the N remaining teeth or tooth spaces. Almost as soon as the carrier begins to move the cam 71 allows switch 67 to close. The cam 69 is so adjusted that as soon as the carrier has moved far enough for deburring to be complete, it momentarily closes switch 66 thereby energizing coil A of relay 2R to open contacts 2R–1 and 2R–2 and close contacts 2R–3. This energizes coil B of motor controller 3R, causing reverse operation of the motor and return motion of the tool carrier, clockwise in FIG. 5. When this return motion is complete the cam 71 opens switch 67. This deenergizes relay 1R, opening contacts 1R–1 and 1R–2 and thereby stopping the motor by deenergizing the winding of controller 3R; and closing contacts 1R–3 which energizes relay winding 2R–B, thereby closing contacts 2R–1 and 2R–2 and opening contacts 2R–3 in preparation for the next de-burring cycle.

Having now described the preferred embodiment and its mode of operation, what I claim as my invention is:

1. A de-burring device for an intermittently indexing gear cutting machine having a gear tooth cutter and a work head in which a work spindle is rotatable in the process of cutting the several teeth of a work gear on the spindle, the device comprising a de-burring tool mounted on the head for motion about the axis of said spindle, said tool being arranged to remove burrs from a portion of the periphery of the work gear by said rotation of the work spindle during said process of tooth cutting and from the remainder of said periphery by motion of the tool on the head about said axis, and a drive for effecting said motion of the tool.

2. A device according to claim 1 in which the said drive is such that said motion of the tool is an oscillation about the axis of said spindle.

3. A device according to claim 2 in which there are means for controlling the drive in sequence with the tooth cutting operation of the machine, said means being arranged to cause said oscillation of the tool to occur upon completion of such tooth cutting operation.

4. A device according to claim 3 in which the machine has a slide for effecting relative withdrawal between the tool and work head at the conclusion of the tooth cutting operation, and said means for controlling the drive are arranged to effect the oscillation of the tool upon such withdrawal.

5. A device according to claim 4 in which the drive comprises a reversible motor, and said means for controlling the drive comprises a motor starting switch operated by withdrawal motion of said slide, a motor reversing switch operated by and upon motion of the tool through a predetermined angle on said head about the spindle axis, and a motor stop switch operated by and upon return of the tool through said angle.

6. A device according to claim 1 having a carrier for said tool mounted on the head for rotation about said axis, and said drive comprising a reversible motor, reversing and stop switches for said motor mounted on said head, and cams for actuating said switches carried by the carrier, said cams being independently adjustable on the carrier about the axis of the spindle, for adjusting the amplitude of oscillation of the tool and its terminal angular position on the head.

7. A device according to claim 6 in which the carrier comprises a circular slide rotatable on the head about said axis and an arm carrying said tool and secured to the carrier for angular adjustment thereon also about said axis.

8. A device according to claim 1 having a tool carrier comprising a circular slide mounted on the head for oscillation about said axis by said drive means, an arm secured to said slide for adjustment thereon also about said axis, a bracket adjustable rectilinearly along said arm to vary the radial distance of the tool from said axis, a pivot bracket adjustable rectilinearly on the first-mentioned bracket in a direction parallel to said axis and also about an axis perpendicular to the directions of aforementioned rectilinear adjustments.

9. A device according to claim 1 comprising a carrier for said tool which is mounted on the head for rotation about said axis, and said drive comprises a worm wheel secured to the carrier in coaxial relation to the spindle, a reversible motor secured to the head, and a worm driven by said motor and meshing with said worm wheel.

10. A device according to claim 1 comprising a carrier rotatable on the head about said axis, a tool holder to which the tool is secured and which is pivoted to said tool carrier to provide for movement between a working position and an idle position wherein the tool is clear of the work gear, a spring for urging the tool holder into working position, and a manually operable means for moving the tool holder into and maintaining it in said idle position.

11. A device according to claim 1 having a tool carrier mounted on the head for angular motion about said axis to effect said motion of the tool, a holder for the tool pivoted to the carrier for movement toward and away from the work, a spring for urging motion of the holder toward the work, and a roller on the tool holder for contact with a surface of revolution of the work to limit such motion of the tool holder toward the work.

12. A device according to claim 11 in which there is a manually operable eccentric for moving and holding the tool holder away from the work against the resistance of said spring.

References Cited in the file of this patent

UNITED STATES PATENTS

| | | |
|---|---|---|
| 1,928,770 | Uhlmann et al. | Oct. 3, 1933 |
| 2,184,232 | Christman | Dec. 19, 1939 |
| 2,206,450 | Christman | July 2, 1940 |
| 2,271,438 | Miller | Jan. 27, 1942 |